(12) United States Patent
Wang

(10) Patent No.: US 12,281,936 B2
(45) Date of Patent: Apr. 22, 2025

(54) PROCESSING METHOD AND ELECTRONIC DEVICE

(71) Applicant: Lenovo (Beijing) Limited, Beijing (CN)

(72) Inventor: Yukun Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/544,682

(22) Filed: Dec. 19, 2023

(65) Prior Publication Data

US 2024/0219228 A1   Jul. 4, 2024

(30) Foreign Application Priority Data

Dec. 30, 2022  (CN) .................... 202211730856.5

(51) Int. Cl.
  *G09G 3/20*  (2006.01)
  *G01J 1/42*  (2006.01)
  *G01J 1/44*  (2006.01)

(52) U.S. Cl.
  CPC .............. *G01J 1/4204* (2013.01); *G09G 3/20* (2013.01); *G01J 2001/444* (2013.01); *G09G 2320/08* (2013.01); *G09G 2360/144* (2013.01); *G09G 2360/16* (2013.01)

(58) Field of Classification Search
  CPC .... G01J 1/4204; G01J 2001/444; G09G 3/20; G09G 2320/08; G09G 2360/144; G09G 2360/16
  See application file for complete search history.

(56) References Cited

U.S. PATENT DOCUMENTS

| | | | |
|---|---|---|---|
| 2015/0029209 A1* | 1/2015 | He | G06F 3/0346 345/581 |
| 2020/0265799 A1* | 8/2020 | Choi | G06F 1/1652 |
| 2021/0109213 A1* | 4/2021 | Hamlin | G01S 7/4868 |
| 2021/0264876 A1* | 8/2021 | Peng | G09G 5/10 |
| 2021/0325242 A1* | 10/2021 | Chen | H05K 5/0017 |
| 2022/0229466 A1* | 7/2022 | Yildiz | G06F 3/04886 |
| 2022/0382335 A1* | 12/2022 | Suzuki | G01J 1/4228 |
| 2023/0087988 A1* | 3/2023 | He | G09G 3/20 345/77 |
| 2023/0206409 A1* | 6/2023 | Peana | G06T 5/92 382/274 |

\* cited by examiner

Primary Examiner — Bryan Earles
(74) Attorney, Agent, or Firm — ANOVA LAW GROUP, PLLC

(57) ABSTRACT

A processing method includes: obtaining an ambient light detection value through an ambient light detection module; obtaining display information of a first display module; and based on the display information, adjusting the ambient light detection value to obtain an ambient light adjustment value.

14 Claims, 3 Drawing Sheets

---

Obtaining relative posture information and display status, the relative posture information including a relative posture between the first body and the second body, and the display status including whether the first display module is in a display state — S201

Based on the relative posture information and the display status, determining whether to adjust the ambient light detection value — S202

PROCESSING METHOD AND ELECTRONIC DEVICE

CROSS-REFERENCE TO RELATED APPLICATION

This application claims priority to Chinese Patent Application No. 202211730856.5, filed on Dec. 30, 2022, and the entire content of which is incorporated herein by reference.

TECHNICAL FIELD

The present disclosure relates to the technical field of electronic device technology, and more particularly, to a processing method and an electronic device.

BACKGROUND

Currently, detection data of a light sensor is used as a basis for adjusting brightness of a display screen. Thus, if the detection data of the light sensor is not accurate enough, it will affect user experience of the display screen.

SUMMARY

One aspect of the present disclosure provides a processing method. The method includes: obtaining an ambient light detection value through an ambient light detection module; obtaining display information of a first display module; and based on the display information, adjusting the ambient light detection value to obtain an ambient light adjustment value.

Another aspect of the present disclosure provides an electronic device. The electronic device includes: a first body including an ambient light detection module; a second body being connected to the first body, a first display module being disposed at a first surface of the second body; and a processing module being disposed at either the first body or the second body, and being used to adjust an ambient light detection value obtained by an ambient light detection module based on display information of the first display information to obtain an ambient light adjustment value.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

Figure 1:
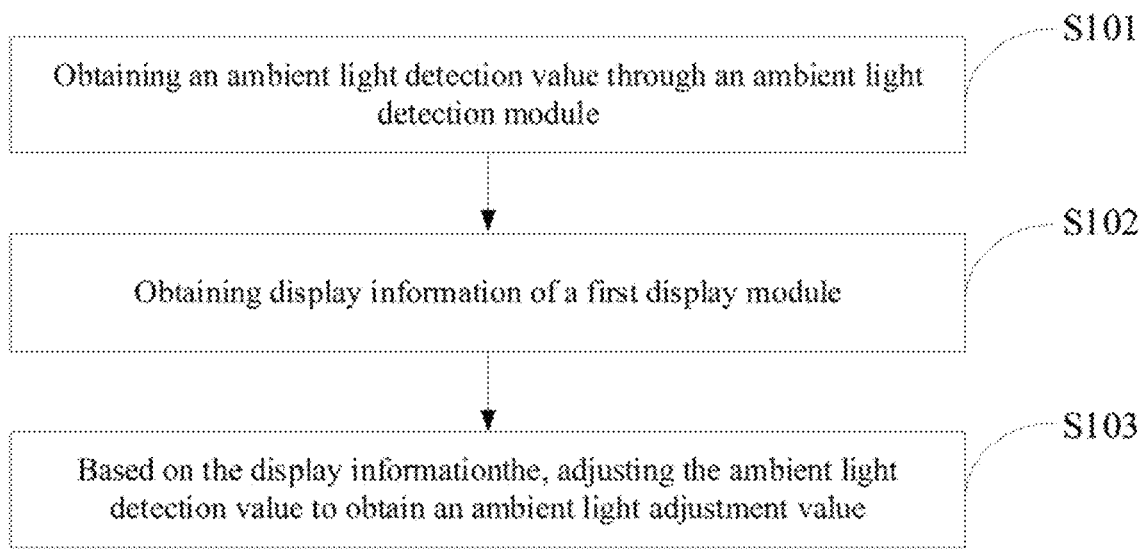
FIG. 1 is a flowchart of an exemplary processing method according to some embodiments of the present disclosure.

Various aspects and features of the present disclosure are described herein with reference to the accompanying drawings.

Obviously, various modifications may be made to embodiments described herein. Thus, the description should not be construed as limiting, but merely as examples of the embodiments. Other modifications within the scope and spirit of the present disclosure will be obtained by those skilled in the art.

The accompanying drawings, which are incorporated in and constitute a part of the specification, illustrate the embodiments of the present disclosure and, together with the general description of the present disclosure given and the detailed description of the embodiments, serve to explain the principle of the present disclosure.

These and other features of the present disclosure will be apparent from the description of the embodiments given as non-limiting examples with reference to the accompanying drawings.

It is further to be understood that, although the present disclosure has been described with reference to specific examples, those skilled in the art will be able to undoubtedly implement many other equivalent forms of the present disclosure, which have the characteristics as claimed and therefore fall within the scope of protection.

Other aspects, features, and advantages of the present disclosure will be apparent in view of the following detailed description when taken in conjunction with the accompanying drawings.

Hereinafter, specific embodiments of the present disclosure will be described with reference to the accompanying drawings. However, it should be understood that the embodiments are merely examples of the present disclosure, which can be implemented in various ways. Well-known and/or repeated functions and structures have not been described in detail to avoid obscuring the description of the present disclosure with unnecessary or redundant detail. Therefore, specific structural and functional details claimed herein are not intended to be limiting, but merely serve as a representative basis for the claims to teach one skilled in the art to utilize the present disclosure in substantially any suitable detailed structure.

This specification may use the phrases "in one embodiment," "in another embodiment," "in yet another embodiment," "in some embodiments," or "in some other embodiments," which may refer to the same thing in accordance with the present disclosure. or one or more of the different embodiments.

The present disclosure provides a processing method that can be applied to an electronic device having at least one display module or to an electronic device including a light-emitting device in addition to the display module. Through the processing method provided by the embodiment of the present disclosure, the impact of the display module and other light-emitting devices on an ambient light detection module can be weakened or even eliminated, thereby making a final detection value more consistent with ambient conditions of the electronic device and improving user experience.

To facilitate understanding of the present disclosure, the processing method provided by the present disclosure is described in detail. Here, an executer of the processing method according to the embodiment of the present disclosure may be an embedded controller of an electronic device, or it may also be a separately configured processor, etc.

FIG. 1 is a flowchart of an exemplary processing method according to some embodiments of the present disclosure. As shown in FIG. 1, the processing method includes the following processes.

At S101, an ambient light detection value is obtained through an ambient light detection module.

In some implementations, electronic devices such as laptops are usually equipped with the ambient light detection module. The ambient light detection module is used to collect ambient light information surrounding a display module, and then based on the collected ambient light information, to adjust a display parameter of the display module.

In some embodiments, the ambient light detection value is also obtained through a pre-configured ambient light detection module. The ambient light detection value may include information such as color and/or brightness of ambient light.

At S102, display information of a first display module is obtained.

In some embodiments, the display information of the first display module in the electronic device can be pre-configured by a user or manufacturer of the electronic device, or can be automatically adjusted by the electronic device according to a current application scenario. As such, the display information of the first display module can be obtained in real time. For example, a request for obtaining the display information of the first display module is sent to an embedded controller of the electronic device, or a pre-configured period is set in advance such that the embedded controller provides the display information of the first display module to a processor and the like according to the pre-configured period.

Here, the ambient light detection module is arranged on a first body, the first display module is arranged on a second body, and the second body where the first display module is arranged is connected to the first body where the ambient light detection module is arranged. In some embodiments, one side of the first body is connected to one side of the second body. For example, in a dual-screen notebook computer, the first body has sides A and B, the second body has sides C and D, the ambient light detection module is arranged on side B, and the first display module is arranged on side C.

At S103, the ambient light detection value is adjusted based on the display information to obtain an ambient light adjustment value.

To eliminate interference of light generated by the first display module on a detection result of the ambient light detection module, the embodiment of the present disclosure is configured to adjust the ambient light detection value based on the display information of the first display module to obtain the more accurate ambient light adjustment value.

Figure 2:
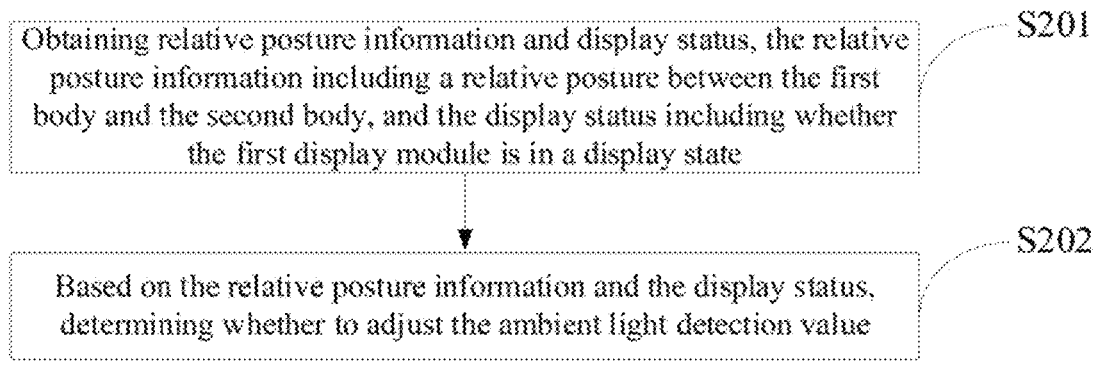
FIG. 2 is a flowchart for determining whether a current electronic device satisfies a condition for adjusting an ambient light detection value in an exemplary processing method according to some embodiments of the present disclosure.

In some embodiments, before adjusting the ambient light detection value based on the display information, it is necessary to determine whether the current electronic device satisfies a condition for adjusting the ambient light detection value, for example, according to a method flowchart shown in FIG. 2 to determine whether the current electronic device satisfies the condition for adjusting the ambient light detection value, which includes S201 and S202.

At S201, relative posture information and display status are obtained. The relative posture information includes a relative posture between the first body and the second body, and the display status includes whether the first display module is in a display state.

At S202, whether to adjust the ambient light detection value is determined based on the relative posture information and the display status.

For example, when an angle formed by the first body and the second body is greater than or equal to 90 degrees, the interference of the light generated by the first display module on the detection result of the ambient light detection module is negligible or may be totally absent. When the first display module is not running, that is, it does not display any information, the first display module will not generate any light at this time, that is, it will not affect the detection result of the ambient light detection module. Thus, one or more of the above conditions may be selected as a basis for whether to adjust the ambient light detection value.

Therefore, when determining whether the electronic device currently satisfies the condition for adjusting the ambient light detection value, for example, the relative posture information and the display status can be obtained. The relative posture information includes the relationship between the first body and the second body, and the display status includes whether the first display module is in the display state. Then, based on the relative posture information and the display status, whether to adjust the ambient light detection value is determined. For the method of obtaining the relative posture information and the display status, reference can be made to the method of obtaining the display information of the first display module, and will not be described in detail herein.

For example, when determining whether to adjust the ambient light detection value based on the relative posture information and the display status, the method determines whether projection of the ambient light detection module falls on a first surface of the second body (such as C side of a notebook computer) based on the relative posture information, and determines whether the display status of the first display module is displaying. When the projection of the ambient light detection module falls on the first side, and the display status of the first display module is displaying, the method adjusts the ambient light detection value.

In some embodiments, the relative posture information indicates that the projection of the ambient light detection module does not fall on the first surface of the second body, that is, the angle formed by the first body and the second body is greater than or equal to 90 degrees, and/or, the display status of the first display module is not displaying, that is, the first display module does not display any information. At this time, the first display module will not affect displaying of the second display module. Thus, it is determined that there is no need to adjust the ambient light detection value. In some other embodiments, the relative posture information indicates that the projection of the ambient light detection module falls on the first surface of the second body, that is, the angle formed by the first body and the second body is less than 90 degrees, and the display status of the first display module is displaying, that is, the first display module displays information. At this time, the light generated by the first display module will affect displaying of the second display module. Thus, it is determined to adjust the ambient light detection value.

In the embodiments of the present disclosure, the display information of the first display module is used to adjust the ambient light detection value obtained by the ambient light detection module on the first body to obtain the ambient light adjustment value, thereby eliminating the interference of the light generated by the first display module on displaying of the second display module provided on the first body. Thus, a display parameter of the second display module can be accurately adjusted to improve display effect and user experience.

Figure 3:
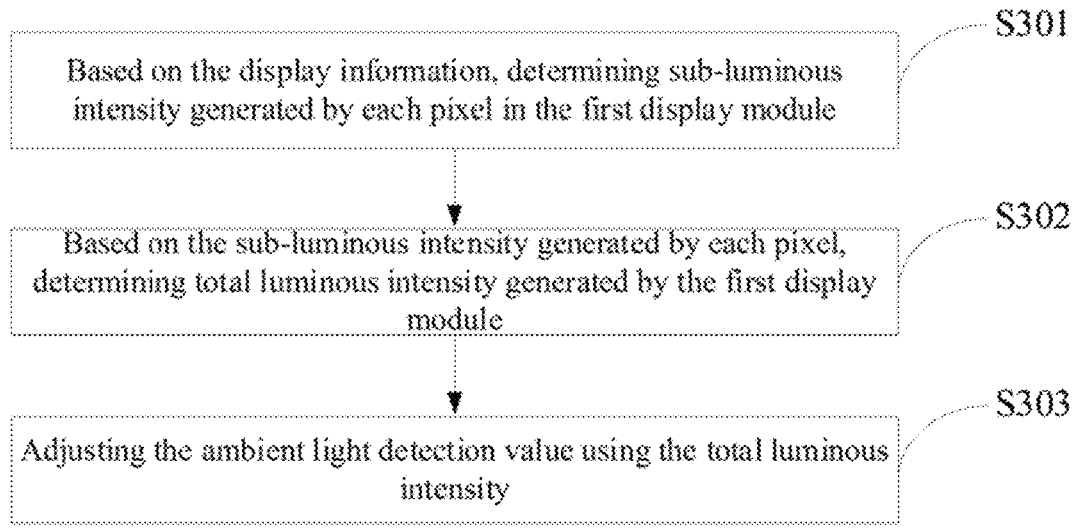
FIG. 3 is a flowchart for adjusting an ambient light detection value in an exemplary processing method according to some embodiments of the present disclosure.

FIG. 3 is a flowchart for adjusting an ambient light detection value in an exemplary processing method according to some embodiments of the present disclosure. As shown in FIG. 3, the adjusting includes the following processes.

At S301, a sub-luminous intensity generated by each pixel in the first display module is determined based on the display information.

At S302, based on the sub-luminous intensity generated by each pixel, a total luminous intensity generated by the first display module is determined.

At S303, the total luminous intensity is used to adjust the ambient light detection value.

Here, each display module includes a plurality of pixels when displaying information. Thus, the sub-luminous intensity generated by each pixel in the first display module is determined based on the display information to determine the interference by each pixel on displaying of the second display module, thereby substantially improving accuracy of the ambient light adjustment value.

Figure 4:
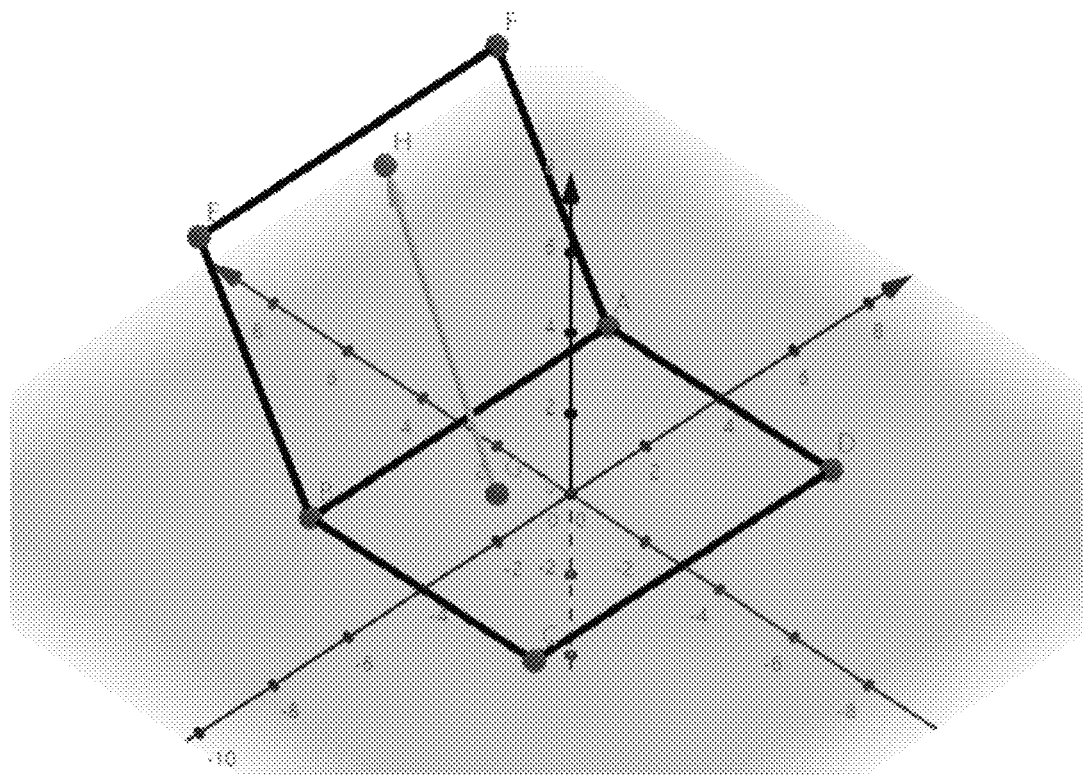
FIG. 4 is a schematic diagram of a three-dimensional (3D) coordinate system according to some embodiments of the present disclosure.

In some embodiments, a three-dimensional (3D) coordinate system is constructed as shown in FIG. 4. FIG. 4 is a schematic diagram of a 3D coordinate system according to some embodiments of the present disclosure. In the 3D coordinate system, the first display module is disposed at an ABCD plane, the second display module is disposed at an ABEF plane, and the ambient light detection module is disposed at point H. An origin of the 3D coordinate system is set at the center of the first display module. FIG. 4 is only an example provided by the embodiments of the present disclosure. The origin of the 3D coordinate system can also be set at point B, point C, etc. of the first display module, which is not limited by the present disclosure.

In the constructed 3D coordinate system, first position information of the ambient light detection module is determined in the 3D coordinate system, and second position information of each pixel in the first display module is determined in the 3D coordinate system. The first position information and the second position information are both preset by the manufacturer of the electronic device and can be obtained directly based on attribute information of the electronic device.

After the first position information and the second position information are determined, a relative position relationship between each pixel and the first body and the ambient light detection module is determined based on the first position information and the second position information. Each of the pixels and the ambient light detection module form a connecting line. The relative position relationship includes: a first angle between the connecting line and the first body, a second angle between the connecting line and the second body, and a distance between the pixel and the ambient light detection module. The display information includes the color and the brightness of the plurality of pixels.

For each pixel, the sub-luminous intensity generated by the pixel is determined based on the relative position relationship and the display information corresponding to the pixel. Considering that a non-monochromatic light is formed by superposition of three monochromatic lights, R (red), G (green) and B (blue), the sub-luminous intensity generated by each pixel is calculated through the following formula (1).

$$\Phi_{xy} = p(\beta_{xy})(P_{xy}(\lambda_R)V_S(\lambda_R) + P_{xy}(\lambda_G)V_S(\lambda_G) + P_{xy}(\lambda_B)V_S(\lambda_B)) \quad (1)$$

where, $\Phi_{xy}$ represents a luminous flux generated at pixel $a_{xy}$, $p(\beta_{xy})$ represents light transmittance of the first display module with $\beta_{xy}$ at pixel $a_{xy}$ measured at the factory, $\beta_{xy}$ represents the second angle, and A represents a light at pixel $a_{xy}$, $\lambda_R$ represents a red light at pixel, $\lambda_G$ represents a green light at pixel $a_{xy}$, $\lambda_B$ represents a blue light at pixel $a_{xy}$, $P(\lambda)$ represents a radiation power, $V_S(\lambda)$ represents a relative visual acuity function. The sub-luminous intensity generated by a pixel in the embodiment of the present disclosure may be equal to the luminous flux generated at the pixel.

After obtaining the sub-luminous intensity generated by each pixel, the total luminous intensity generated by the first display module is determined based on the sub-luminous intensity generated by each pixel. In some embodiments, the total illuminous intensity is the sum of the sub-luminous intensities corresponding to all pixels.

After obtaining the total luminous intensity generated by the first display module, the ambient light detection value is adjusted using the total luminous intensity. The ambient light detection value includes an ambient light intensity collected by the ambient light detection module.

Here, considering that there may be a certain error in the total luminous intensity calculated above, when using the total luminous intensity to adjust the ambient light detection value, the total luminous intensity is first adjusted using a preset adjustment value to obtain an adjusted total luminous intensity. The preset adjustment value includes a pre-calculated adjustment coefficient, a reference distance determined when calculating the adjustment coefficient, and light transmittance of the first display module. Specifically, the adjusted total luminous intensity is calculated according to formulas (2)-(5) below to adjust the ambient light detection value using the adjusted total luminous intensity.

$$E_{xy} = k \cdot \Phi_{xy} \cdot \frac{\cos\theta_{xy}}{\cos\theta_0} \cdot \frac{r_0^2}{r_{xy}^2} = \frac{kp(\beta_{xy})(P_{xy}(\lambda_R)V_S(\lambda_R) + P_{xy}(\lambda_G)V_S(\lambda_G) + P_{xy}(\lambda_B)V_S(\lambda_B))\cos\theta_{xy}r_0^2}{r_{xy}^2} \quad (2)$$

$$k = \frac{E_0}{\Phi_0} = \frac{E_0}{P_0(\lambda_R)V_S(\lambda_R) + P_0(\lambda_G)V_S(\lambda_G) + P_0(\lambda_B)V_S(\lambda_B)} \quad (3)$$

$$E_S = E_{11} + \ldots + E_{mn} \quad (4)$$

$$E' = E - E_S \quad (5)$$

where, $E_{xy}$ represents the adjusted sub-luminous intensity of pixel $a_{xy}$, k represents the adjustment coefficient, $\Phi_{xy}$ represents the luminous flux generated at pixel $a_{xy}$, $p(\beta_{xy})$ represents the light transmittance of the first display module with $\beta_{xy}$ at pixel $a_{xy}$ measured at the factory, $\beta_{xy}$ represents the second angle, A represents the light at pixel $a_{xy}$, $\lambda_R$ represents the red light at pixel $a_{xy}$, $\lambda_G$ represents the green light at pixel $a_{xy}$, $\lambda_B$ represents the blue light at pixel $a_{xy}$, $P(\lambda)$ represents the radiation power, $V_S(\lambda)$ represents the relative visual acuity function, $r_{xy}$ represents the distance between the pixel dry and the ambient light detection module, $\Phi_{xy}$ represents the first angle, $E_S$ represents the adjusted total luminous intensity of the first display module, E represents the ambient luminous intensity collected by ambient light detection module, E' represents the ambient luminous intensity including the ambient light adjustment value, $\Phi_0$ represents a reference luminous flux determined when calculating the adjustment coefficient, $P_0$ represents a reference radiation power when calculating the adjustment coefficient, $r_0$ represents the reference distance, x is in a range of 0-m, x is in a range of 0-n.

The first display module includes a displaying region of m×n pixels, which are respectively labeled as $a_{11} \ldots a_{mn}$, and the coordinates thereof are $(x_{11}, y_{11}, 0), \ldots, (x_{mn}, y_{mn}, 0)$.

Through the processing method, the ambient light adjustment value can be determined more accurately, that is, the total luminous intensity of the light generated by the first display module is eliminated, and then the display parameter of the second display module is adjusted based on the ambient light adjustment value. Thus, the interference of the light generated by the first display module on displaying of the second display module is eliminated, and the display effect and user experience are improved.

Similarly, the present disclosure also provides an electronic device executing the processing method. Because the operation principle of the electronic device in the present disclosure is similar to the disclosed processing method, reference can made to the description of the processing method for the operation of the electronic device, and the detail description thereof is omitted.

Figure 5:
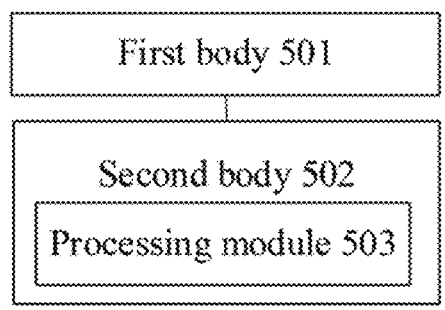
FIG. 5 is a schematic structural diagram of an exemplary electronic device according to some embodiments of the present disclosure.

FIG. 5 is a schematic structural diagram of an exemplary electronic device according to some embodiments of the present disclosure. As shown in FIG. 5, the electronic device includes a first body 501, a second body 502, and a processing module 503.

The first body 501 includes an ambient light detection module.

The second body 502 is connected to the first body, and includes a first display module arranged on a first surface.

The processing module 503 is provided on the first body or the second body and is used to adjust an ambient light detection value obtained by the ambient light detection module according to display information of the first display module to obtain an ambient light adjustment value.

For example, as shown in FIG. 5, the processing module 503 is provided on the second body 502.

In some embodiments, the ambient light detection module is provided on the first body, the first display module is provided on the second body, and the processing module 503 is further configured to: obtain relative posture information and display status, where the relative posture information includes a relative posture between the first body and the second body, and the display status includes whether the first display module is in a display state; and according to the relative posture information and the display status, determine whether to adjust the ambient light detection value.

In some embodiments, when determining whether to adjust the ambient light detection value based on the relative posture information and the display status, the processing module 503 is further configured to: determine whether projection of the ambient light detection module falls on the second body according to the relative posture information; and if the projection of the ambient light detection module falls on the second body and the first display module is in the display state, the ambient light detection value needs to be adjusted.

In some embodiments, when adjusting the ambient light detection value according to the display information, the processing module 503 is further configured to: determine a sub-luminous intensity corresponding to each pixel in the first display module according to the display information; based on the sub-luminous intensity generated by each pixel, determine a total luminous intensity generated by the first display module; and adjust the ambient light detection value using the total luminous intensity.

In some embodiments, when using the total luminous intensity to adjust the ambient light detection value, the processing module 503 is further configure to: adjust the total luminous intensity based on a preset adjustment value to obtain the adjusted total luminous intensity; and adjust the ambient light detection value based on the adjusted total luminous intensity.

In some embodiments, when determining the sub-luminous intensity generated by each pixel in the first display module based on the display information, the processing module 503 is further configured to: construct a 3D coordinate system; determine first position information of the ambient light detection module in the 3D coordinate system, and determine second position information of each pixel of the first display module in the 3D coordinate system; based on the first position information and the second position information, determine relative position relationship between each pixel, the first body, and the ambient light detection module; and based on the relative position relationship and the display information corresponding to each pixel, determine sub-luminous intensity generated by each pixel.

In some embodiments, each pixel and the ambient light detection module form a connection line, and the relative position relationship includes: a first angle between the connection line and the first body, a second angle between the connection line and the second body, and a distance between the pixel and the ambient light detection module. The display information includes the color and brightness of the pixel.

In some embodiments, the first body includes a second display module, and the processing module 503 is further configured to adjust the display parameter of the second display module according to the ambient light adjustment value.

In the embodiments of the present disclosure, the display information of the first display module is used to adjust the ambient light detection value obtained by the ambient light detection module on the first body to obtain the ambient light adjustment value, thereby eliminating the interference of the light generated by the first display module on displaying of the second display module provided on the first body. Thus, the display parameter of the second display module can be accurately adjusted to improve the display effect and user experience.

The present disclosure further provides a storage medium. The storage medium is a computer-readable medium and stores a computer program. When the computer program is executed by a processor, the processing method provided by the embodiments of the present disclosure is performed. The processing method includes the following processes.

At S11, the ambient light detection value is obtained through the ambient light detection module.

At S12, the display information of the first display module is obtained.

At S13, the ambient light detection value is adjusted according to the display information to obtain the ambient light adjustment value.

In the embodiments of the present disclosure, the display information of the first display module is used to adjust the ambient light detection value obtained by the ambient light detection module on the first body to obtain the ambient light adjustment value, thereby eliminating the interference of the light generated by the first display module on displaying of the second display module provided on the first body. Thus, the display parameter of the second display module can be accurately adjusted to improve the display effect and user experience.

Figure 6:
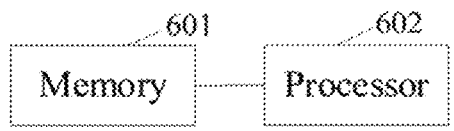
FIG. 6 is a schematic structural diagram of another exemplary electronic device according to some embodiments of the present disclosure.

The present disclosure further provides an electronic device. FIG. 6 is a schematic structural diagram of another exemplary electronic device according to some embodiments of the present disclosure. As shown in FIG. 6, the electronic device includes at least a memory 601 and a processor 602. The memory 601 stores a computer program. The processor 602 executes the computer program stored on the memory 601 to implement the processing method provided by the embodiments of the present disclosure. For example, the computer program of the electronic device includes the following processes:

At S21, the ambient light detection value is obtained through the ambient light detection module.

At S22, the display information of the first display module is obtained.

At S23, the ambient light detection value is adjusted according to the display information to obtain the ambient light adjustment value.

In the embodiments of the present disclosure, the display information of the first display module is used to adjust the ambient light detection value obtained by the ambient light detection module on the first body to obtain the ambient light adjustment value, thereby eliminating the interference of the light generated by the first display module on displaying of the second display module provided on the first body. Thus, the display parameter of the second display module can be accurately adjusted to improve the display effect and user experience.

In some embodiments, the storage medium may include but is not limited to: a U disk, a read-only memory (ROM), a random-access memory (RAM), a mobile hard disk, a magnetic disk, an optical disk, or suitable media that can store program codes. In some embodiments, the processor executes the processing method described in the embodiments according to the program codes stored in the storage medium. In some embodiments, reference can be made to the examples described in the embodiments and optional implementations, and details will not be described again herein. In some embodiments, those skilled in the art should understand that the above-described modules or steps of the present disclosure can be implemented using general-purpose computing devices, and they can be concentrated on a single computing device, or distributed across a network composed of multiple computing devices. In some embodiments, they may be implemented in program code executable by a computing device, such that they may be stored in a storage device for execution by the computing device, and in some cases, may be in a sequence different from that herein. The steps shown or described are performed either individually as individual integrated circuit modules, or as multiple modules or steps among them as a single integrated circuit module. As such, the present disclosure is not limited to any specific combination of hardware and software.

Furthermore, while the embodiments have been described herein, the scope thereof includes any and all implementations based on the present disclosure that have equivalent elements, modifications, omissions, combinations (e.g., cross-cutting of various embodiments), adaptations, or changes. Elements in the claims are to be construed broadly based on the language employed in the claims and are not limited to the examples described in this specification or during the practice of the present disclosure. The examples are to be construed as non-exclusive. It is intended that the specification and examples be considered as examples only, with a true scope and spirit being indicated by the following claims, along with their full scope of equivalents.

The above description is intended to be illustrative rather than restrictive. For example, the above examples (or one or more versions thereof) may be used in combination with each other. For example, other embodiments may be used by those of ordinary skill in the art upon reading the above description. Additionally, in the above detailed description, various features may be grouped together to simplify the present disclosure. This should not be interpreted as an intention that an unclaimed disclosed feature is essential to any claim. Rather, the subject matter of the present disclosure may lie in less than all features of a particular disclosed embodiment. Thus, the following claims are hereby incorporated into the detailed description as examples or embodiments, with each claim standing on its own as a separate embodiment, and with it being contemplated that these embodiments may be combined with one another in various combinations or permutations. The scope of the present disclosure should be determined with reference to the appended claims, along with the full scope of equivalents to which such claims are entitled.

Various embodiments of the present disclosure have been described in detail above, but the present disclosure is not limited to these specific embodiments. Those skilled in the art can make various variations and modifications to the embodiments based on the concepts of the present disclosure. These variations and modifications all should fall within the protection scope of claimed by the present disclosure.

What is claimed is:

1. A processing method, comprising:
    obtaining an ambient light detection value through an ambient light detection module, the ambient light detection module being disposed at a first body;
    obtaining display information of a first display module, the first display module being disposed at a second body;
    obtaining relative posture information and display status, the relative posture information including a relative posture between the first body and the second body, and the display status including whether the first display module is in a display state;
    based on the relative posture information and the display status, determining whether the ambient light detection value needs to be adjusted; and
    in response to determining that the ambient light detection value needs to be adjusted, based on the display information, adjusting the ambient light detection value to obtain an ambient light adjustment value, wherein adjusting the ambient light detection value based on the display information comprises:
        based on the display information and relative position relationship in a three-dimensional (3D) coordinate system between each pixel, the first body, and the ambient light detection module, determining sub-luminous intensity generated by each pixel in the first display module;
based on the sub-luminous intensity generated by each pixel, determining total luminous intensity generated by the first display module; and
adjusting the ambient light detection value using the total luminous intensity.

2. The processing method according to claim 1, wherein determining whether the ambient light detection value needs to be adjusted based on the relative posture information and the display status comprises:
based on the relative posture information, determining whether projection of the ambient detection module falls on the second body; and
in response to the projection of the ambient light detection module falling on the second body, and the first display module being in the display state, adjusting the ambient light detection value.

3. The processing method according to claim 1, wherein adjusting the ambient light detection value using the total luminous intensity comprises:
based on a preset adjustment value, adjusting the total luminous intensity to obtain adjusted total luminous intensity; and
based on the adjusted total luminous intensity, adjusting the ambient light detection value.

4. The processing method according to claim 1, wherein determining the sub-luminous intensity generated by each pixel in the first display module comprises:
constructing the 3D coordinate system;
determining first position information of the ambient light detection module in the 3D coordinate system, and determining second position information of each pixel in the first display module in the 3D coordinate system;
based on the first position information and the second position information, determining the relative position relationship between each pixel, the first body, and the ambient light detection module; and
based on the relative position relationship and the display information corresponding to each pixel, determining the sub-luminous intensity generated by each pixel.

5. The processing method according to claim 4, wherein each pixel and the ambient light detection module form a connection line, and the relative position relationship comprises:
a first angle between the connection line and the first body, a second angle between the connection line and the second body, and a distance between the pixel and the ambient light detection module, the display information including color and brightness of the pixel.

6. The processing method according to claim 1, further comprising:
based on the ambient light adjustment value, adjusting a display parameter of a second display module being disposed at the first body.

7. An electronic device, comprising:
a first body including an ambient light detection module;
a second body being connected to the first body, a first display module being disposed at a first surface of the second body; and
a processing module being disposed at either the first body or the second body, and being configured to:
obtain an ambient light detection value through the ambient light detection module;
obtain display information of a first display module;
obtain relative posture information and display status, the relative posture information including a relative posture between the first body and the second body, and the display status including whether the first display module is in a display state;
based on the relative posture information and the display status, determine whether the ambient light detection value needs to be adjusted; and
in response to determining that the ambient light detection value needs to be adjusted, based on the display information, adjust the ambient light detection value to obtain an ambient light adjustment value, wherein when adjusting the ambient light detection value based on the display information, the processing module is further configured to:
based on the display information and relative position relationship in a three-dimensional (3D) coordinate system between each pixel, the first body, and the ambient light detection module, determine sub-luminous intensity generated by each pixel in the first display module;
based on the sub-luminous intensity generated by each pixel, determine total luminous intensity generated by the first display module; and
adjust the ambient light detection value using the total luminous intensity.

8. The electronic device according to claim 7, wherein:
the first body includes a second display module;
based on the ambient light adjustment value, the processing module adjusts a display parameter of the second display module.

9. A non-transitory computer-readable storage medium storing a computer program, when being executed by a processor, the computer program causing the processor to:
obtain an ambient light detection value through an ambient light detection module, the ambient light detection module being disposed at a first body;
obtain display information of a first display module, the first display module being disposed at a second body;
obtain relative posture information and display status, the relative posture information including a relative posture between the first body and the second body, and the display status including whether the first display module is in a display state;
based on the relative posture information and the display status, determine whether the ambient light detection value needs to be adjusted; and
in response to determining that the ambient light detection value needs to be adjusted, based on the display information, adjust the ambient light detection value to obtain an ambient light adjustment value, wherein when adjusting the ambient light detection value based on the display information, the processor is further configured to:
based on the display information and relative position relationship in a three-dimensional (3D) coordinate system between each pixel, the first body, and the ambient light detection module, determine sub-luminous intensity generated by each pixel in the first display module;
based on the sub-luminous intensity generated by each pixel, determine total luminous intensity generated by the first display module; and
adjust the ambient light detection value using the total luminous intensity.

10. The non-transitory computer-readable storage medium according to claim 9, wherein when determining whether the ambient light detection value needs to be adjusted based on the relative posture information and the display status, the processor is further configured to:
- based on the relative posture information, determine whether projection of the ambient detection module falls on the second body; and
- in response to the projection of the ambient light detection module falling on the second body, and the first display module being in the display state, adjust the ambient light detection value.

11. The non-transitory computer-readable storage medium according to claim 9, wherein when adjusting the ambient light detection value using the total luminous intensity, the processor is further configured to:
- based on a preset adjustment value, adjust the total luminous intensity to obtain adjusted total luminous intensity; and
- based on the adjusted total luminous intensity, adjust the ambient light detection value.

12. The non-transitory computer-readable storage medium according to claim 9, wherein when determining the sub-luminous intensity generated by each pixel in the first display module, the processor is further configured to:
- construct the 3D coordinate system;
- determine first position information of the ambient light detection module in the 3D coordinate system, and determine second position information of each pixel in the first display module in the 3D coordinate system;
- based on the first position information and the second position information, determine the relative position relationship between each pixel, the first body, and the ambient light detection module; and
- based on the relative position relationship and the display information corresponding to each pixel, determine the sub-luminous intensity generated by each pixel.

13. The non-transitory computer-readable storage medium according to claim 12, wherein each pixel and the ambient light detection module form a connection line, and the relative position relationship comprises:
- a first angle between the connection line and the first body, a second angle between the connection line and the second body, and a distance between the pixel and the ambient light detection module, the display information including color and brightness of the pixel.

14. The non-transitory computer-readable storage medium according to claim 9, wherein the processor is further configured to:
- based on the ambient light adjustment value, adjust a display parameter of a second display module being disposed at the first body.

\* \* \* \* \*